United States Patent [19]
Viola

[11] Patent Number: 5,934,434
[45] Date of Patent: Aug. 10, 1999

[54] DISK WITH FRICTION LINERS FOR A MECHANICAL CLUTCH

[75] Inventor: Paolo Viola, Farmington Hills, Mich.

[73] Assignee: Valeo, Paris, France

[21] Appl. No.: 08/810,953

[22] Filed: Feb. 27, 1997

[30] Foreign Application Priority Data

Feb. 27, 1996 [FR] France .................................. 96 02403

[51] Int. Cl.⁶ .................................................. F16D 13/64
[52] U.S. Cl. ..................................... 192/107 C; 192/52.6
[58] Field of Search ............................ 192/107 C, 52.6, 192/200

[56] References Cited

U.S. PATENT DOCUMENTS

| | | | |
|---|---|---|---|
| 4,516,672 | 5/1985 | Caray .................................. | 192/107 C |
| 5,452,783 | 9/1995 | Thirion De Briel et al. . | |
| 5,601,173 | 2/1997 | Thirion De Briel et al. ...... | 192/107 C |

FOREIGN PATENT DOCUMENTS

| | | |
|---|---|---|
| 110599 | 6/1984 | European Pat. Off. . |
| 0579554 | 1/1994 | European Pat. Off. . |
| 2370893 | 6/1978 | France . |
| 3519245 | 12/1985 | Germany ............................ 192/107 C |
| 3643274 | 6/1988 | Germany . |
| 1465913 | 3/1977 | United Kingdom ................ 192/107 C |
| 94-21934 | 9/1994 | WIPO . |

OTHER PUBLICATIONS

Patent Abstracts of Japan vol. 006, No. 026 (M–112) & JP 56 143,818.

*Primary Examiner*—John A. Jeffery
*Assistant Examiner*—William C Joyce
*Attorney, Agent, or Firm*—Longacre & White

[57] ABSTRACT

A disc with friction liners for a mechanical clutch. The blades of the disc include, in the region of each zone (4) in which a friction liner is fixed, a slightly raised portion (1), which prevents overflow of the adhesive on to the bending zones (10) that join the central portion (4) to supplementary engagement zones (7).

3 Claims, 1 Drawing Sheet

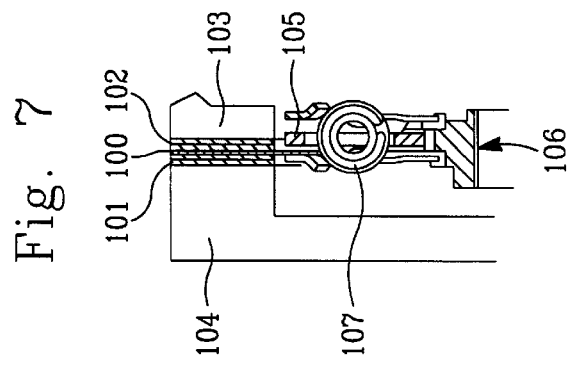
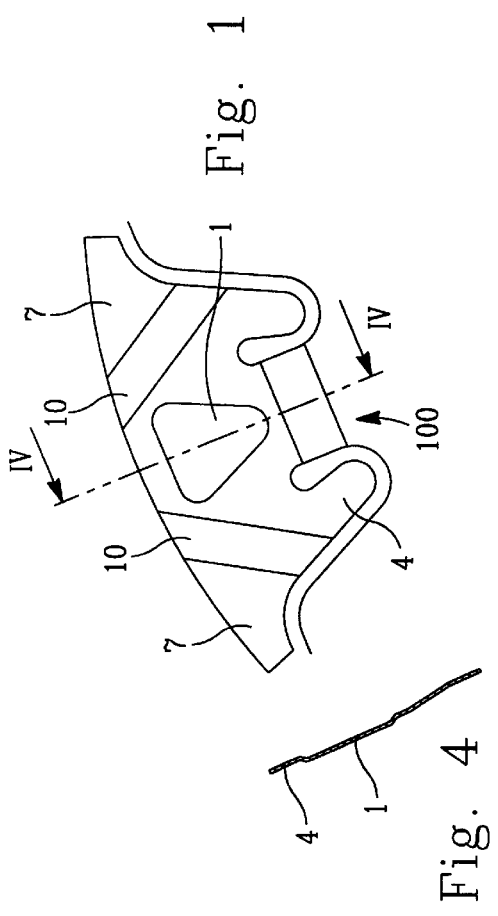
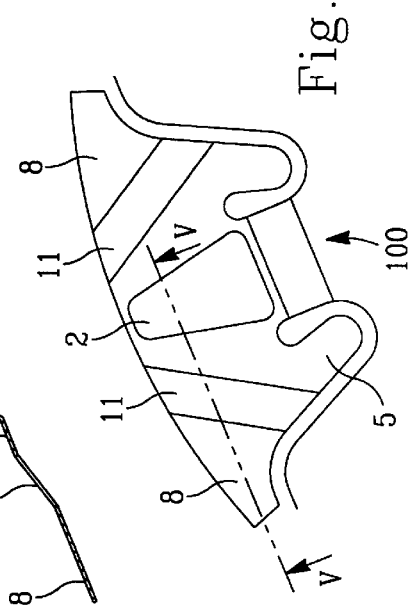
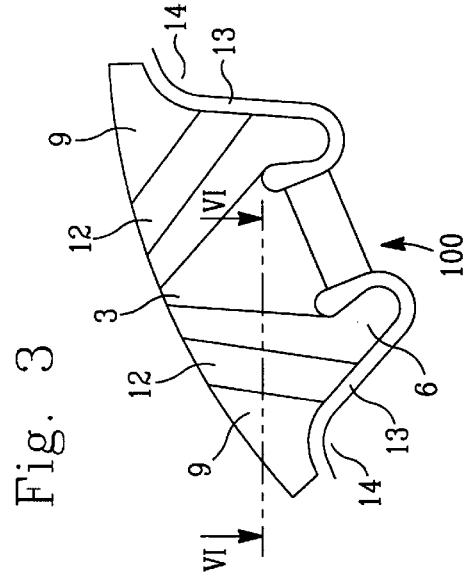
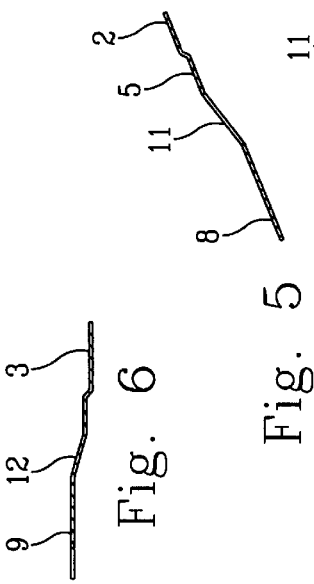

DISK WITH FRICTION LINERS FOR A MECHANICAL CLUTCH

BACKGROUND OF THE INVENTION

1. Field of the Invention

The present invention relates to a disc having friction liners for a mechanical clutch, the disc including in its peripheral region, surrounding its central portion, fastening zones which are generally parallel to the plane of the central portion, firstly for a first liner which is annular or divided into pads, and which is arranged to make frictional contact with the pressure plate of the clutch, and secondly for a second liner, which is also annular or divided into pads, and which is arranged to make frictional contact with the reaction plate of the clutch.

The peripheral region of the disc may be annular and continuous, but it is currently divided into radial blades carrying the above mentioned fastening zones, these blades being joined to the central portion of the disc through a foot and serving alternately for the fastening of the first liner and for the fastening of the second liner.

The blades may be integral with the central portion of the disc, or they may be attached to it by means of rivets. The blades on which one liner is to be fixed may be of a different form from the blades on which the other liner is to be fixed, and these forms may in themselves be very varied, according to the effect which is required, or manufacturing requirements.

The blades may also all be of the same form, for example that of a curtain, and they may be bent in one direction and in the other so that they themselves have fastening zones which serve for the alternate fastening of one of the liners and the other liner.

2. Description of the Prior Art

Examples of blades of these different types are given in the documents EP-A-0 579 554 (U.S. Pat. No. 5,452,783) and FR-A-2 370 893. In order to increase the rigidity of the fastening of the liners, and so as to obtain more regular wear in the liners without fretting, it is common practice, and is the case in the two documents mentioned above, to provide on each blade, for example on either side of the zone in which it is fastened on the liner concerned, supplementary engagement zones which are offset axially towards the other liner and which are able to engage with the latter.

That being so, the function of such a disc, where the latter is art of a clutch friction wheel of a mechanical clutch, the most common application of which is of course in the automotive field, is sufficiently well known by the engineer in this field for there to be no need to describe it in detail. It will be enough to recall (FIG. 7) that, when the clutch pedal is released, the two liners 101, 102 of the disc 100 are under load and are solidly coupled, by being gripped between the pressure plate 103 and the reaction plate 104, to the pressure plate and reaction plate so as to rotate with these latter, the reaction plate being driven by the crankshaft of the engine. The disc 100 carrying the liners therefore drives, either through interposed springs 107 or directly, a radial plate 105 which meshes, with or without a circumferential clearance, with a central hub 106 which is itself in engagement with the input shaft of the gearbox, so that the latter is in consequence driven by the crankshaft. Such a mode of operation is described in Application PCT/FR94/00297 (WO94/21934), which also discloses a large number of versions of forms of radial blades, including tripod blades.

In one embodiment of the Application WO-A-94/21934, fastening of the liners is obtained by adhesive bonding, and the peripheral region includes blades having bending lines which separate a central zone, defining a fastening zone, from supplementary engagement zones.

The liners are adhesively bonded on the central zone of the blades.

The central zones of the blades are raised with respect to the central portion of the disc, due to the fact that they are offset axially with respect to the central portion.

SUMMARY OF THE INVENTION

The present invention is concerned more particularly with fastening of the liners on the blades of the discs.

The problem has two aspects, namely:

(1) The presence, on the blades, of supplementary engagement zones, as mentioned above, gives rise to a tendency of the blades to bend in their central zone when they are put under load between the pressure and reaction plates, or for the purpose of adhesive bonding.

As a result the surface area offered by these blades to the liners tends to be concentrated on the bent portions, whether the blades and liners are assembled together by adhesive bonding or by means of rivets, and this gives rise to a danger of the liners becoming dented;

(2) In the operation of fastening by adhesive bonding, the problem arises of how to delimit the portion of the blade surface that carries the adhesive. Adhesion is obtained by depositing blobs of adhesive which are concentrated in the middle of the blade. Assembly is then carried out by applying pressure to the blade under 20 bars; as a result, the adhesive spreads over an irregular surface with indefinite contours, on which it is only possible to act to some extent, by judiciously adjusting the parameters (i.e. the quantity of adhesive, and pressure).

Under these conditions, it often happens that the adhesive overflows on the blade with respect to the surface of the latter which has to be in contact with the liner. When the fastening zone or blade, and this is the case especially with tripod blades, includes bent portions for creating the supplementary engagement zones, it can even happen that the adhesive overflows on to the bent portions, which is detrimental to their function in that it stiffens them, even giving rise to a danger of lumps of adhesive preventing any movement.

The object of the present invention is to eliminate these drawbacks, and to this end, a disc having friction liners, of the general type defined at the beginning of this document, wherein, in the region of each fastening zone, at least one of the two surfaces of contact between a friction liner and the peripheral region comprises a raised flat portion, and wherein the peripheral region is divided into blades which include bending lines, which separate a central zone constituting a fastening zone from supplementary engagement zones, is characterised in that the raised flat portions are arranged on the central zones of the blades and are spaced away from the bending lines.

In the case where the liners are fixed on the blades by adhesive bonding, the surface area corresponds to the surface which is arranged for adhesive attachment. It will be appreciated that the raised portions will be very easy to make by press-forming, involving minimal modification of the press-tool. A very small backward deflection, of 0.2 millimeters for example, will in general be enough to avoid any lumps of adhesive appearing outside the actual fastening zone; where a slight excess has been applied, the adhesive will automatically stop at the perimeter of the raised portion due to capillarity forces, without it being able to invade the bent zones of the blades.

The raised net portions will also have the advantage of stiffening the blades, and preventing the bending mentioned above, when a load is applied between the pressure and reaction plates or in the adhesive bonding operation. This stiffening advantage will however also be obtained in the case where the disc and the liners are assembled together by riveting. In general terms, this stiffening effect leads to increased regularity in the wear in the liners, while preserving good progressive action during operation of the clutch.

BRIEF DESCRIPTION OF THE DRAWINGS

FIGS. 1 to 3 are partial front views of the peripheral region of a disc according to the present invention.

FIG. 4 is a cross sectional view taken along line IV—IV of FIG. 1.

FIG. 5 is a cross sectional view taken along line V—V of FIG. 2.

FIG. 6 is a cross sectional view taken along line VI—VI of FIG. 3.

FIG. 7 is an axial cross section of a mechanical clutch embodying the disc according to the present invention.

DETAILED DESCRIPTION OF A PREFERRED EMBODIMENT

In the drawings, the raised flat portions are shown shaded, and have the reference numerals 1, 2 and 3 respectively; they constitute zones in relief, and are press-formed to a depth of the order of 0.2 millimetres on the central zone, or fastening zone, of the blades indicated by the reference numerals 4, 6 and 6 respectively. These central zones are separated from supplementary engagement zones 7, 8 and 9 respectively (the purpose of which has been explained above) by bent portions 10, 11 and 12 respectively, which in this example are in the form of an inverted V. For more details, reference should be made to the document U.S. Pat. No. 5,452,783 or to the corresponding document EP-A-0 579 554.

It will be recalled that each of the central zones 4, 5, 6 is offset axially by means of a tangential bent portion, delimited by two parallel edges (not denoted by reference numerals) with respect to the central portion of the disc 100. This tangential bent portion is part of a foot which joins the central zone 4, 5, 6 to the central portion of the disc.

The central zones 4 to 6 are thus raised with respect to the central portion of the disc 100. The folds 10, 11, 12 are inclined towards the outer periphery of the blade concerned. The supplementary engagement zones 7, 8, 9 are offset axially with respect to the central portions 4, 5, 6 by means of the bent portions 10, 11, 12. Because of the bent portions, each blade has three engagement zones at its outer periphery, and one engagement zone at its inner periphery.

The blades can of course be of the same type as those described in the document FR-A-2 370 893, so that it can be that the central zones 4 to 6 are not raised.

This being so, it will be seen from the drawings that the raised flat portions for adhesive attachment are arranged largely in the interior of the bent portions, which prevents the adhesive reaching the region of these bent portions even in the event of excess adhesive, which avoids dispersion and maintains good behaviour of the disc even when hot. In addition, the blades are stiffened in their central fastening zones, thus opposing the tendency of the blade to become dished when the clutch is in its engaged position under pressure exerted by axially acting resilient means, such as a diaphragm, which urge the pressure plate towards the reaction plate so as to grip the liners.

The stiffening of the blade is of particular advantage in the embodiment shown in FIG. 1, due to the fact that the base of the triangle defined by the relief zone 1 is on the same side as the outer periphery of the disc.

The requirements of adhesive bonding are, on the other hand, of advantage in the embodiment shown in FIG. 2, in which the base of the triangle defined by the relief zone 2 is situated on the same side as the center of the disc, which enables the space between the edges of the zone and the bent portions 11 to be increased. In addition, the center of gravity of the adhesive bonding surface between the blade and the friction disc being offset inwardly, this enables the lever arm which is present after deformation of the liners under heat, due to differential expansion, to be reduced.

Finally, the embodiment in FIG. 3 is a variant on the preceding embodiment, with a base of the triangle 3 being further widened and extending between the bases of the arcuate slots 13 that separate the corresponding tripod blade from the narrower neighbouring blades 14.

This embodiment is also simpler to manufacture from the tooling point of view.

It will be appreciated that the invention is of particular advantage in the context of "tripod" blades, because the central fastening zone 4, 5, 6 of the corresponding liner has a large surface area. During re-engagement of the clutch, good progressivity is obtained in the gripping of the liners, because the bent portions 10, 11, 12 are not clogged by the adhesive.

The deformation of the pressure and reaction plates when hot is closely followed, by virtue of the bent portion which is present in the region of the foot joining the zones 4, 5, 6 to the central portion.

In another version, fastening can of course be obtained by riveting, with the raised portions 1, 2, 3 being then perforated.

I claim:

1. A disc having friction liners for a mechanical clutch, the disk comprising a peripheral region surrounding a central portion, fastening zones which are generally parallel to the plane of the central portion for fastening a first friction liner which is annular or divided into pads, and which is arranged to make frictional contact with a pressure plate of the mechanical clutch, and wherein the fastening zones are for fastening a second friction liner, which is also annular or divided into pads, and which is arranged to make frictional contact with a reaction plate of the mechanical clutch, wherein, in a region of each fastening zone, at least one of two surfaces of contact between one of the friction liners and the peripheral region comprises a raised flat portion (1, 2, 3), and wherein the peripheral region is divided into blades which include bending lines (10, 11, 12), which separate each of the fastening zones (4, 5, 6) from supplementary engagement zones (7, 8, 9), wherein the raised flat portions (1, 2, 3) are centrally arranged on the fastening zones of the blades and are spaced away from the bending lines, the fastening of the friction liners on the peripheral region is obtained by adhesive bonding, and the surface of the raised flat portions (1, 2, 3) corresponds to the surface which is provided for the adhesive bonding in the region of each fastening zone.

2. A disc according to claim 1, wherein the bending lines (10, 11, 12) define a V, and the raised flat portions (1, 2, 3) are in the form of triangles having sides spaced away from the bending lines.

3. A disc according to claim 2, wherein a base of the triangles are oriented radially inward with respect to the disk.

* * * * *